H. A. GRINE.
MEANS FOR MAKING PRODUCER GAS FROM LIQUID HYDROCARBONS.
APPLICATION FILED MAR. 16, 1910.
1,013,013.
Patented Dec. 26, 1911.
3 SHEETS—SHEET 1.
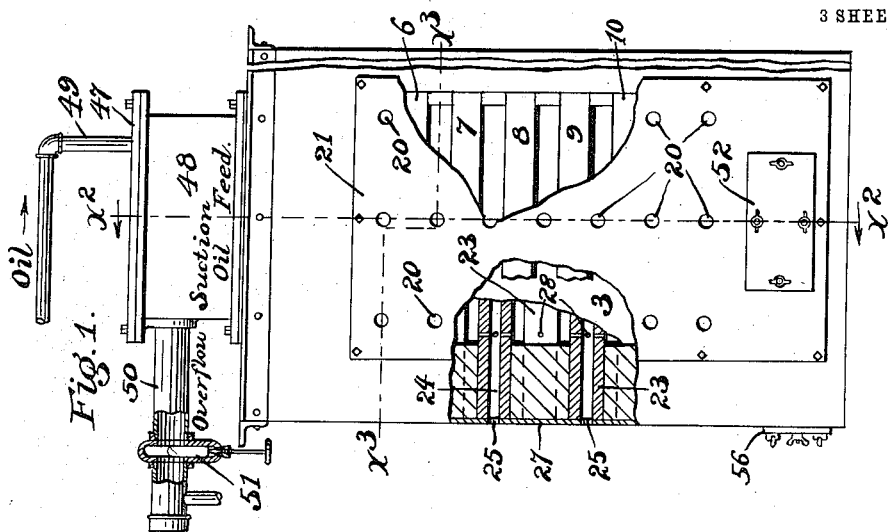
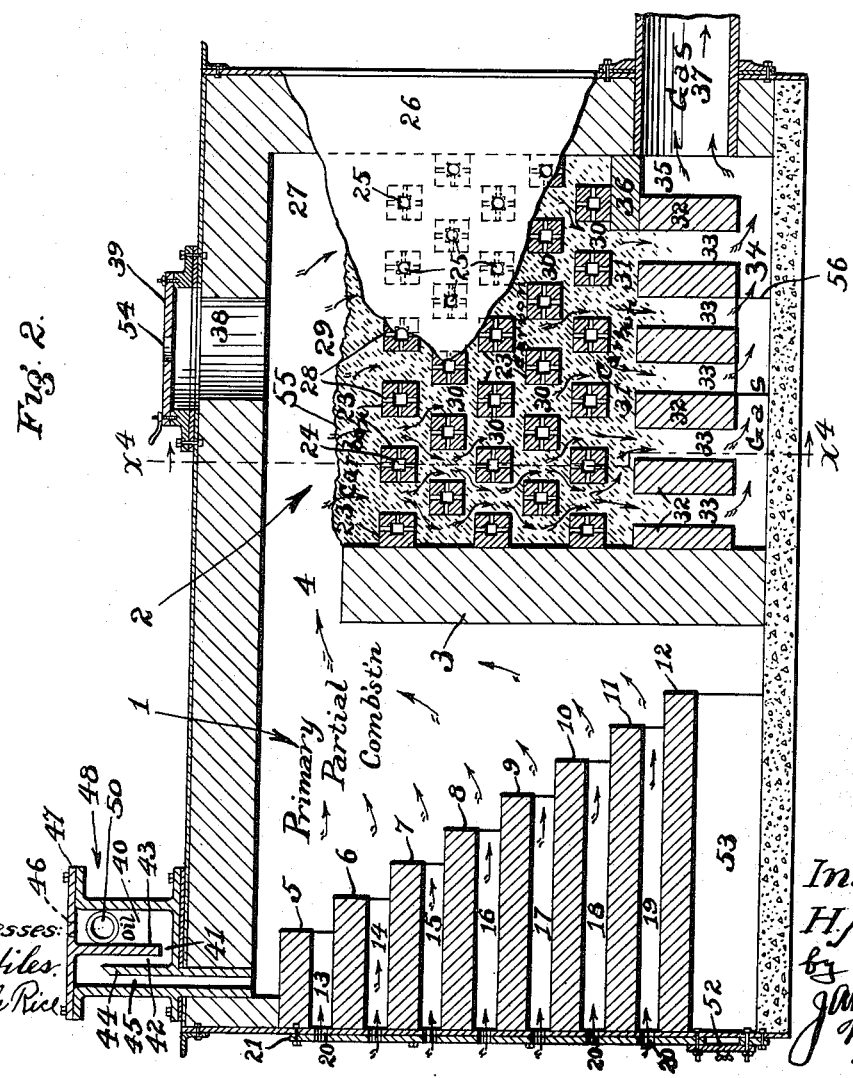
Inventor:
H. A. Grine
by James P. Townsend
his Atty.
Witnesses:
G. H. Hiles
L. Belle Rice

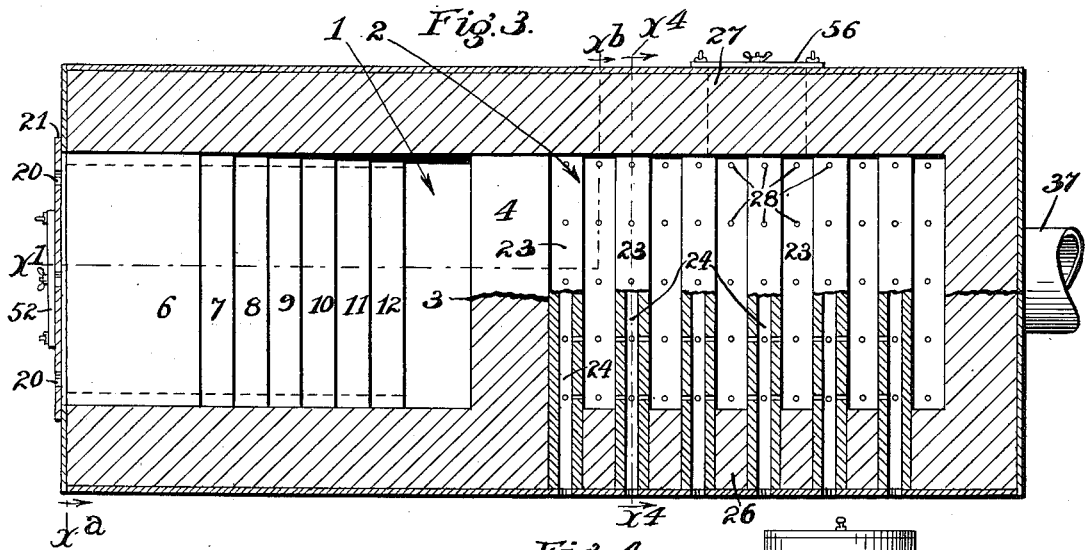

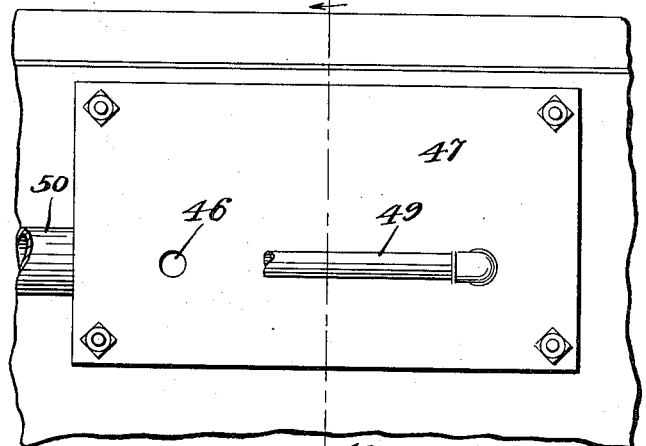
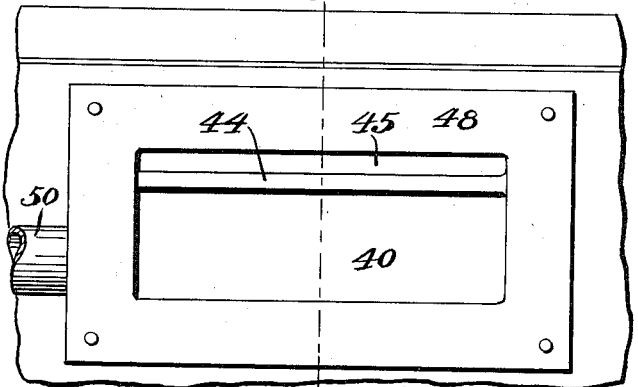
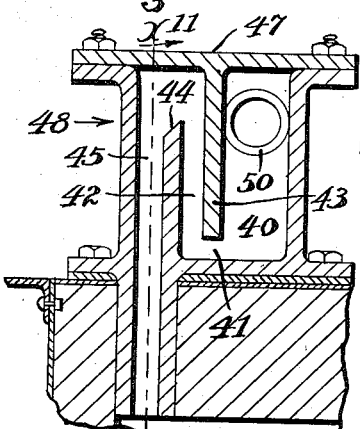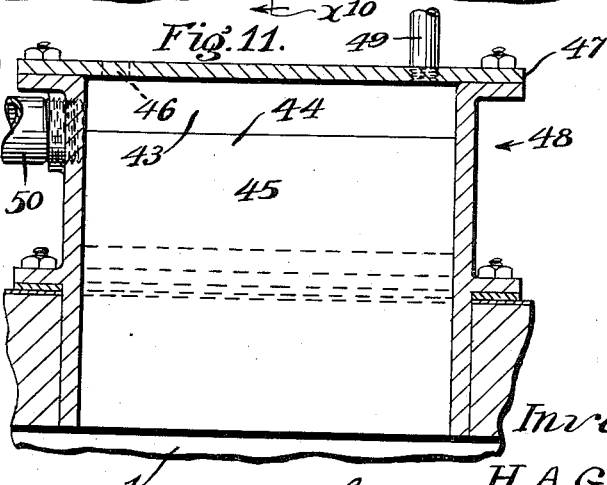

UNITED STATES PATENT OFFICE.

HARRY A. GRINE, OF LOS ANGELES, CALIFORNIA, ASSIGNOR OF ONE-THIRD TO FRED C. NELLES, OF LOS ANGELES, CALIFORNIA, AND ONE-THIRD TO GEORGE R. HARRISON, OF SAN DIEGO, CALIFORNIA.

MEANS FOR MAKING PRODUCER-GAS FROM LIQUID HYDROCARBONS.

1,013,013.  Specification of Letters Patent.  Patented Dec. 26, 1911.

Application filed March 16, 1910.  Serial No. 549,763.

*To all whom it may concern:*

Be it known that I, HARRY A. GRINE, a citizen of the United States, residing at Los Angeles, in the county of Los Angeles and State of California, have invented new and useful Means for Making Producer-Gas from Liquid Hydrocarbons, of which the following is a specification.

This invention relates in part to an apparatus for the production of producer gas, and pertains more particularly to an apparatus adapted for use in carrying out improvements on a certain process of making producer gas which is described and claimed in my application for United States Patent Serial No. 485,539, filed in the United States Patent Office March 24, 1909, and patented March 22, 1910, No. 952,989.

In carrying out my new process which includes forming a bed of solid carbonaceous matter of the solid products of the partial combustion of the oil, I now support these products in some way to prevent them from packing and choking the generator, and have provided means for bringing air into the carbonaceous bed and keep such bed at a temperature to effect a continuous partial combustion of the solid carbonaceous matter therein, and thereby break down the tarry products and form a fixed gas of the whole. For this purpose I partly fill the solid carbon chamber with a series of hollow perforated tiles on and between which the solid matter is caused to accumulate, and these tiles are provided with central air spaces communicating with the outside air supply, and with small air ducts leading from the air spaces through the walls of the tiles into the carbonaceous material, thus permeating the carbonaceous bed with fresh oxygen or atmospheric air. This gives a wide distribution of the air and brings it into direct contact with the carbon that accumulates on the tiles. The operator may control the combustion of the solid carbonaceous material by closing or opening some of the orifices leading into the tiles from the atmosphere.

Objects of this invention are: to provide a novel and improved apparatus for the manufacture of what is ordinarily termed producer or fuel gas from liquid hydrocarbons, especially crude oils including petroleum having an asphaltic base, said apparatus having a large gasifying surface in a small space and being simple in operation and cheap to construct, and adapted for continuous operation where advisable; to provide a gas producer apparatus in which all of the liquid hydro-carbon is converted into fixed gas leaving no by-products to dispose of; to make improved provision for holding inside the producer, accumulations of the solid products of partial combustion of the oil, to form an incandescent bed, through which the gases pass for the purpose of breaking up the tarry matter and fixing the gases; and for preventing any tarry matter from passing out with the gas, thus avoiding a serious objection ordinarily militating against the use of producer gas in internal combustion engines; to so introduce air to the carbonaceous material as to obtain the best results in the production of carbon monoxid; to dispense with the necessity of and the use of automatically operated valves for proportioning the oil and air.

It is a principle of this invention to so construct the apparatus that the oil will be held spread out where it is subjected to the action of atmospheric air and the heat of combustion and to continuously bring the ungasified portions in contact with more air in such quantities as to produce a combustible gas and to prevent deposits of carbon from forming on the bottom of the generator and clogging it.

Other objects and advantages may appear from the subjoined detail description.

My novel method and apparatus invented by me for carrying on the same will be understood from the following description, reference being had to the accompanying drawings in which;

Figure 1 is a front elevation of the apparatus, a portion of the front plate being broken away, at the right side of the view on vertical line practically indicated by $X^1$—$X^a$, Fig. 3, and the front plate, the cascade plates and the fire brick separating wall being broken at the left of the view on a line practically indicated by $X^1$—$X^b$, Fig. 3, to expose the air admitting tiles. Fig. 2 is an elevation partly in vertical mid-section on line $X^2$, Fig. 1. A portion of the nearest side wall is also shown. Fig. 3 is a plan section taken on an irregular plane practically indicated by line $X^3$, Figs. 1 and 4. Fig. 4 is a vertical section on line $X^4$, Figs. 2 and 3. Fig. 5 is an enlarged fragmentary detail, partly in section to illustrate an air port with a plug inserted therein. Fig. 6 is a perspective view of one of the carbonaceous bed tiles. Fig. 7 is an enlarged cross section of one of the carbonaceous bed tiles on line $X^7$, Fig. 6. Fig. 8 is an enlarged fragmentary plan to show the automatic oil feed. Fig. 9 is a plan analogous to Fig. 8 omitting the cover. Fig. 10 is a vertical mid-section on line $X^{10}$, Figs. 8 and 9. Fig. 11 is a vertical longitudinal section on line $X^{11}$, Fig. 10.

The apparatus comprises two chambers, a primary chamber 1 and secondary chamber 2, separated for about three-fourths of the distance from the bottom upward by a firebrick wall 3, and communicating over the top of this wall through a passage 4 extending above the top of the wall from side to side of the chambers 1 and 2.

The primary chamber 1 is provided with a cascade formed of non-combustible plates 5, 6, 7, 8, 9, 10, 11, 12, set horizontally, extending entirely across the chamber 1, and each succeeding plate from top to bottom being longer from front to back than the plate immediately above. Between the cascade plates there are air spaces 13, 14, 15, 16, 17, 18 and 19, each of which, independently of the others, communicates with the atmosphere by means of its own independent air inlet openings 20 through the front face or wall plate 21 of the apparatus, and which may be controlled independently of each other by any suitable means as by plugs 22 in Fig. 5, so that the gas produced at the various levels or intervals of the cascade will be combustible and have the desired composition.

The secondary chamber 2 acts as a fixing chamber for the hydrocarbon gases and as an accumulator for solid carbonaceous matter resulting from the partial combustion of the liquid hydrocarbon, and is partly filled with a series of hollow laterally perforated non-combustible tiles 23, each of which is constructed with an air chamber 24 extending axially through the tile and connecting with the external air through the secondary air inlet openings 25 in the side walls 26, 27, and also provided with small air ducts 28 leading from the central air chamber 24 into the secondary chamber 2. The central air chamber 24 communicates with the outside air through openings in the side walls of the generator so that air drawn in through the hollow tiles will pass into the secondary chamber 2 of the generator through the small lateral openings to come in contact with the solid carbon, which in practical operation will be deposited on the tiles from the products of the partial combustion occurring in the primary chamber 1. The tiles 23 are spaced apart and arranged in staggered relation to each other, and an open space 29 is provided above the hollow tiles 23 to distribute the gas equally to the inter-tile spaces 30 into which the small air ducts 28 open.

Below the hollow perforated tiles 23 an open space 31 is provided through which the gas flows from said tiles and the accumulations of carbon, 55, thereon, and below such space 31 sills 32 of fire brick or other high heat resisting material are arranged spaced apart and providing a plurality of passages 33 through which gases flow down to an unobstructed space 34 forming a gas passage at the bottom of the secondary chamber 2, communicating with an upwardly extending passage 35 which is cut off at its top from the secondary chamber 2 by a plate 36 of practically the same material as the sills 32. Said upward extension 35 discharges into the outlet or main 37 which leads to the usual washers, scrubbers or cleaners, not shown, from whence the gas flows to the place of consumption, as an internal combustion engine, not shown. The purpose of the arrangement thus shown at the bottom of the secondary chamber is to mix the gas and give an even pull on the gas in the secondary chamber so that the mixture will be drawn from all parts of such chamber. An opening 38 in the top of the generator serves as a stack opening in starting and as an opening through which to return to the generator solid carbonaceous matter, extracted in the scrubber, not shown. The lid 39 for said opening closes the same during the process of making gas.

Any sort of device may be used to deliver oil to the top plate 5 of the cascade, such as sight feed droppers, a sprayer or the like. The oil feed which I propose to use is shown in the accompanying drawings. It is constructed and operates on the principle of a U-tube manometer and works automatically by the variation of the suction on the interior of the apparatus.

40 is the oil reservoir forming one leg of the U and communicating through an opening 41 with a duct 42 between the plates 43, 44, and therewith forms the U manometer. The dividing plate 43 separates the reservoir 40 from the duct 42 except through the opening 41 under the oil.

44 is the plate over which the oil flows from the leg 42, and 45 is a duct leading into the generator above the top cascade plate 5. The chamber 40 is open to the atmosphere above the oil through an aperture 46 in the top 47 of the case 48 of the oil-delivering device. Oil is delivered into the reservoir 40 in excess of the amount needed through a supply-pipe 49 leading in through the top 47 and an overflow pipe 50 leads from the reservoir chamber 40 to return excess of oil to a tank, not shown, from which it is returned to supply-pipe 49.

A gate valve 51 is provided to adjust the level of the oil in the reservoir for an average load on the engine. After the level of the oil in reservoir 40 has been adjusted for average load, the feed is automatically controlled by the suction within the generator as follows:—If a greater load is put on the engine, thus demanding more gas, a greater suction is created on the generator and the oil rises in the leg 42 and more oil overflows over plate 44 and through duct 45 into the generator, making more gas. A door 52 through the front is provided to give access to the primary chamber 1 through a passage 53 underneath the lowermost cascade plate 12. If less load is on the engine the oil sinks in duct 42 due to less suction in the generator, less oil flows into the generator and less gas is formed.

To start the apparatus into operation the lid 39 is raised, and a fire of any combustible material is started at the back bottom of the primary or cascade chamber 1, and oil is turned on at pipe 49 and flows onto the top plate 5, and thence flows onward, taking fire in passing down the cascade. The gases are allowed to escape through the stack opening 38 in the top or through a stack, not shown, situated in the outlet pipe 37, until the generator becomes hot. The opening and stack are then closed and the engine, or exhauster, not shown, is started. The bottom hole or door 52 in the front of the generator through which the fire was started is then closed and air is drawn in through the openings in the front and into the hollow tiles after accumulations of solid carbon begin. The oil trickling down over the ends of the cascade plates receives air at each opening between the plates and is constantly subjected to partial combustion. The operator, by inspection through the air holes can determine at what openings air should be admitted. Where no oil is flowing no air should be admitted. The oil or residue thereof which passes one air space receives air again at the next air space, and so on until all is gasified. The gases pass from the primary chamber over the partition to the secondary chamber. This is partly filled with the hollow tiles on which the solid carbonaceous matter deposits to be retained in the form of a bed of solid carbonaceous material until consumed by partial combustion. The small air ducts leading from the air chambers through the centers of the hollow tiles, deliver air directly to the solid carbonaceous matter deposited on the tiles, keping up a continuous partial combustion and incandescence of the solid fuel matter. The deposition of the solid matter and its partial combustion in the secondary chamber serves several purposes. It retains the greater part of this solid matter in the generator until converted into gas, thus giving a cleaner gas than open shell generators; it forms a bed of incandescent carbonaceous material through which the gases must pass thus breaking up tarry matter, and acts as a balance should the oil supply fluctuate.

The advantages of this invention are as follows:—1. Little or no atomizing of the oil is required. 2. After being set for average load the oil supply is automatic. 3. The oil as it passes from one plate to the other comes in direct contact with air in proper proportion to produce combustible gas and is not thrown back into an atmosphere of gas where there is no air to gasify it and it cannot fill the generator with solid carbon formed from the oil as in the case where the oil is injected with an atomizer. 4. The air coming in contact with the ungasified fuel first, combines therewith and does not combine with the gas already made, thus to burn it and leave no air for gasifying the oil. 5. The secondary chamber serves as a gasifying chamber for the solid products of the partial combustion of the oil either by retaining them primarily as the gas passes through, or secondarily, when they are returned to the top of the secondary chamber through the opening in the generator top. 6. The cascade plates serve to hold up the oil in direct contact with fresh air entering between the plates, thus preventing the oil from depositing upon the bottom of the generator and hardening or carbonizing there, which would result in gradually filling the generator. 7. The cascade with independent admission of air at intervals therein, gives a large gasifying surface in a small generator space with properly regulated combustion. 8. The oil feeding and regulating device has no valves to become clogged by foreign matter in the oil. Caps or shutters, not shown, or plugs 22 are provided for the air openings in the outer shell leading into the air spaces between the plates and also for the inlets to the air chambers in the hollow tiles so that the operator may control the amount and place at which the air is admitted. It is thus seen that this producer operates under suction, which may be caused by directly connecting an engine with the producer, and the suction within the generator acts directly upon the surface of the oil in the leg of the reservoir which communicates with the interior of the generator and causes the oil to rise or fall in that leg and overflow in proportion to the demands of the engine.

There are no valves that require close adjustment except the inverted gate valve in the overflow pipe which adjusts the height of the oil in the reservoir and is used only to adjust the average load after which feed is automatic by reason of the rise and fall of the oil in the leg of the reservoir which opens into the generator as the suction operates with the engine.

I do not propose to extinguish the flame and carry the gases into a contracted chamber to combine the same but pass the gases into a chamber adapted to accumulate the solid products of the partial combustion of the oil and to form an incandescent bed of the same. The gases passing through such bed are fixed and the tarry matter is broken up.

By the use of the cascade of horizontally adjusted plates projecting one beyond the other and having independently supplied air spaces between them, the oil which is not gasified at the first plate drops to the second receiving more air on its passage and is partly gasified and so on down until all is gasified without excess of oxygen. In this way the ungasified portion is continuously brought in contact with more fresh air and need not deposit on the bottom of the generator. The plates of the cascade serve to hold up the oil in contact with the air supply at various levels until the oil is gasified, thus preventing the oil from carbonizing on the bottom of the generator and clogging it.

It is important that the combustion in the primary chamber shall not be complete combustion and consequently there is not sufficient heat evolved there to gasify the carbon; and the secondary chamber, by causing the ungasified carbon to accumulate and form a carbonaceous bed, affords an opportunity for providing a continuously incandescent bed of carbon at this place; the incandescence being maintained by introduction of the air into the secondary chamber through the perforated hollow tiles so that the fresh air or oxygen, newly admitted from the external atmosphere, is brought into direct contact with the solid carbonaceous accumulations. These accumulations consist of solid products of the partial combustion and decomposition of the oil such as lamp black, oil-coke or other forms of carbonized oil. The consumption of the solid carbonaceous material in the secondary chamber may be controlled by the operator by opening or closing part of the air openings leading into the hollow tiles. The operator may be guided by observing through a peep hole 54 in the lid 39 when the accumulation is too great or too little; care being taken to maintain appropriate depth of carbon bed to thoroughly break down the tarry matter and fix the gas.

In practical operation the carbonaceous bed will be allowed to form as indicated at 55 in Fig. 2, completely filling the inter-tile spaces and extending above the tiles; said bed being permeable to the air by reason of the natural porosity of the accumulations, which are upheld by the tiles and are thus prevented from packing and becoming solidified toward the bottom, and said tiles also introduce the air interiorly throughout the mass to permeate the bed with newly-admitted oxygen. A door 56 gives access to the bottom gas passage 34 for the purpose of removing any ash or other solids that may fall thereon. Any suitable means may be employed to cause streams of air to flow through the air passages between the plates and to cause a stream of liquid hydrocarbon fuel to pass said air openings while ignited and to thus be supplied with air at a series of succeeding plates until the stream becomes depleted to the desired extent; which, in most satisfactory operation, is to the complete exhaustion of the liquid; so that the stream terminates on a plate. Such exhaustion may occur at any place on those portions of the non-combustible plates which form the cascade; but in the ideal operation of the apparatus, the final depletion or termination of the stream will occur on the surface of the last plate. The number of plates and the size of their vaporizing surfaces may be increased or diminished within the judgment of the constructor to meet the demands of the work for which the producer is designed.

I claim:—

1. The apparatus set forth comprising a primary chamber, a secondary chamber communicating therewith, a cascade in the primary chamber, comprising plates between which are air passages, means to cause liquid hydrocarbon fuel to flow over the plates and across the passages, means in the secondary chamber to accumulate a solid carbonaceous bed from the products of partial combustion occurring in the primary chamber, means to permeate said bed with air, and means to cause the products of partial combustion to flow through the chamber and from said bed.

2. In a gas producer apparatus having a gas outlet, the combination with means for supplying fuel, and means to supply air to produce partial combustion of such fuel; of a gas fixing chamber between the fuel supplying means and the gas outlet, and perforated air supplying means adapted and arranged to accumulate from the gas a carbonaceous bed and to support such bed in said fixing chamber.

3. In a gas producer a fixing chamber provided with hollow tiles communicating with the external air and having lateral perforations and being arranged in staggered relation to each other to introduce air to a carbonaceous bed.

4. The combination with two communicating chambers, of a cascade in one of the chambers and a bed retainer in the other chamber, composed of perforated hollow tiles arranged in staggered relation and communicating with the external air, means to supply oil to the cascade, means to supply air to the cascade at different levels and means to control the air supply at the various levels independently of each other.

5. A gas producer comprising two chambers, means for causing partial combustion of oil in one of said chambers, hollow perforated tiles within the other chamber to gather accumulations of carbonaceous material therein and means to supply oxygen through said tiles to the interior of such mass.

6. In a gas producer of the class described, the combination with a primary combustion chamber of a secondary and solid carbon gasifying chamber consisting of a rectangular fire-brick lined chamber partly filled with a series of hollow tiles, the central air space of said tiles communicating with the atmospheric air and having small air ducts leading through the tile walls into the interior of the secondary chamber for the purpose of introducing air into the solid carbonaceous matter deposited therein, and causing partial combustion and gasification of said solid carbonaceous matter derived from the partial combustion of the liquid hydrocarbon in the primary gasifying chamber.

In testimony whereof, I have hereunto set my hand at Los Angeles, California, this 9th day of March, 1910.

HARRY A. GRINE.

In presence of—
 JAMES R. TOWNSEND,
 L. BELLE RICE.